(12) United States Patent
Zhong et al.

(10) Patent No.: US 9,790,411 B2
(45) Date of Patent: Oct. 17, 2017

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Yang Zhong, Hopkinton, MA (US); Nilanjan Sarangi, Shrewsbury, MA (US); Shu Yang, Worcester, MA (US); Ralph Bauer, Niagara Falls, CA (US); Stefan Vujcic, Buffalo, NY (US)

(73) Assignees: SAINT-GOBAIN ABRASIVES, INC., Worcester, MA (US); SAINT-GOBAIN ABRASIFS, Worcester, MA (US)

( * ) Notice: Subject to any disclaimer, the term of this patent is extended or adjusted under 35 U.S.C. 154(b) by 0 days.

(21) Appl. No.: 14/984,274

(22) Filed: Dec. 30, 2015

(65) Prior Publication Data
US 2016/0186026 A1    Jun. 30, 2016

Related U.S. Application Data

(60) Provisional application No. 62/097,892, filed on Dec. 30, 2014.

(51) Int. Cl.
*B24D 3/20* (2006.01)
*B24D 3/28* (2006.01)
(Continued)

(52) U.S. Cl.
CPC .............. *C09K 3/1409* (2013.01); *B24D 3/28* (2013.01); *B24D 3/34* (2013.01); *C09K 3/1436* (2013.01)

(58) Field of Classification Search
CPC ...... C09K 3/1409; C09K 3/1436; B24D 3/04; B24D 3/14; B24D 3/34
See application file for complete search history.

(56) References Cited

U.S. PATENT DOCUMENTS 4,881,951 A    11/1989    Monroe et al.
4,898,597 A    2/1990    Hay et al.
(Continued)

FOREIGN PATENT DOCUMENTS

CN    1649802 A    8/2005
CN    101247911 A    8/2008
(Continued)

OTHER PUBLICATIONS

International Search Report for PCT/US2015/068154 dated Apr. 4, 2016, 1 pg.
(Continued)

*Primary Examiner* — Pegah Parvini
(74) *Attorney, Agent, or Firm* — Abel Law Group, LLP; Thomas Osborn

(57) ABSTRACT

An abrasive article can include a body including a bond material and abrasive particles contained within the bond material. The abrasive particles can include nanocrystalline alumina. The bond material can include an organic material. In an embodiment, the nanocrystalline alumina may have an average crystallite size of not greater than 1.5 microns. In another embodiment, the bond material and the abrasive particles may be mixed and the mixture may cure to form the abrasive article of embodiments herein.

20 Claims, 4 Drawing Sheets

(51) Int. Cl.
*C09K 3/14* (2006.01)
*B24D 3/34* (2006.01)

(56) References Cited

U.S. PATENT DOCUMENTS

| | | | |
|---|---|---|---|
| 5,178,644 A | 1/1993 | Huzinec | |
| 5,203,886 A | 4/1993 | Sheldon et al. | |
| 5,401,284 A | 3/1995 | Sheldon et al. | |
| 5,516,348 A | 5/1996 | Conwell et al. | |
| 5,527,369 A | 6/1996 | Garg | |
| 5,863,308 A | 1/1999 | Qi et al. | |
| 6,702,867 B2 | 3/2004 | Carman et al. | |
| 6,802,878 B1 | 10/2004 | Monroe | |
| 8,043,393 B2 | 10/2011 | Querel et al. | |
| 2001/0027623 A1* | 10/2001 | Rosenflanz | B24D 3/06 51/309 |
| 2003/0115805 A1 | 6/2003 | Rosenflanz et al. | |
| 2003/0145525 A1 | 8/2003 | Rosenflanz | |
| 2005/0132658 A1 | 6/2005 | Celikkaya et al. | |
| 2007/0074456 A1 | 4/2007 | Orlhac et al. | |
| 2007/0249482 A1 | 10/2007 | Rosenflanz | |
| 2008/0148653 A1 | 6/2008 | Bauer et al. | |
| 2008/0293345 A1* | 11/2008 | Bright | B24B 5/363 451/540 |
| 2009/0098365 A1 | 4/2009 | Moeltgen | |
| 2011/0083374 A1 | 4/2011 | Querel et al. | |
| 2012/0167481 A1 | 7/2012 | Yener et al. | |
| 2012/0247027 A1 | 10/2012 | Sarangi et al. | |
| 2014/0007517 A1 | 1/2014 | Sarangi et al. | |
| 2016/0186027 A1 | 6/2016 | Sarangi et al. | |

FOREIGN PATENT DOCUMENTS

| | | |
|---|---|---|
| EP | 1904252 B1 | 5/2011 |
| TW | 200718511 A | 5/2007 |
| TW | 201402279 A | 1/2014 |

OTHER PUBLICATIONS

International Search Report issued in PCT/US2015/068167 dated Apr. 1, 2016, 1 page.

* cited by examiner

ABRASIVE ARTICLES AND METHODS FOR FORMING SAME

CROSS-REFERENCE TO RELATED APPLICATION(S)

This application claims priority under 35 U.S.C. §119(e) to U.S. Patent Application No. 62/097,892 entitled "ABRASIVE ARTICLES AND METHODS FOR FORMING SAME," by Yang ZHONG et al., filed Dec. 30, 2014, which is assigned to the current assignee hereof and incorporated herein by reference in its entirety.

BACKGROUND OF THE INVENTION

Field of the Disclosure

The present invention relates in general to abrasive articles and, in particular, to bonded abrasive articles including nanocrystalline alumina.

Description of the Related Art

Bonded abrasive articles, such as abrasive wheels, can be used for cutting, grinding, or shaping various materials, such as stone and metal among other materials. Performance of bonded abrasive articles, such as abrasive wheels having microcrystalline alumina bonded within an organic bond material, may rely on hardness, grinding ratio, and other properties of the abrasives. The industry continues to demand improved abrasive articles.

BRIEF DESCRIPTION OF THE DRAWINGS

Embodiments are illustrated by way of example and are not limited in the accompanying figures.

Figure 1:
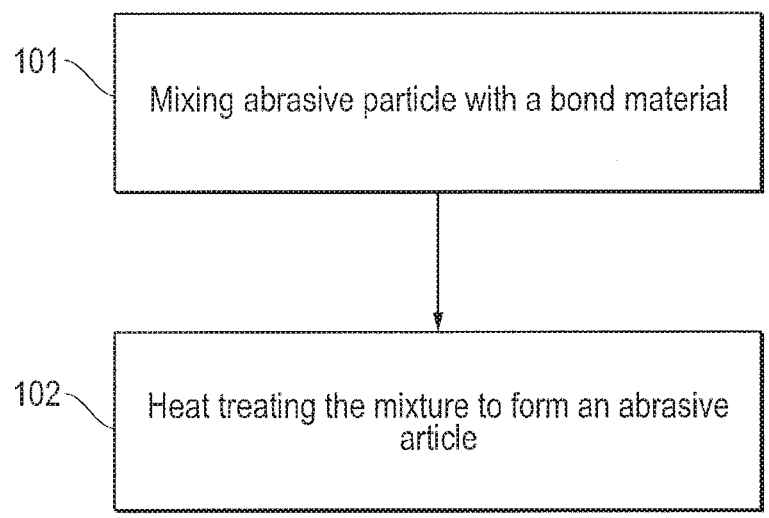
FIG. 1 includes a flow chart for forming an abrasive article.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments disclosed herein are related to abrasive articles including a body including a bond material and abrasive articles contained within the bond material. The bond material can include an organic material. The abrasive particles can include a nanocrystalline alumina. The use of the nanocrystalline alumina of embodiments herein can help to improve hardness and micro-fracturing properties of the abrasive articles.

Other embodiments are related to a method of forming an abrasive article including forming a mixture including the bond material and abrasive articles, and curing the mixture to form the abrasive article. The method can allow formation of the abrasive articles with enhanced performance and improved properties, such as increased G-ratio and Vickers hardness.

FIG. 1 includes a flow chart of a method of forming an abrasive article according to an embodiment. At step 101, a mixture can be made including a bond material (or precursor of the bond material) and abrasive particles comprising nanocrystalline alumina. In certain instances, suitable mixing operations can be utilized to achieve homogenous dispersion of the components within the mixture.

The mixture may also include one or more optional additives, including for example, secondary abrasive particles, fillers, and the like. According to a non-limiting embodiment, the secondary abrasive particles can include alumina oxide, silicon carbide, cubic boron nitride, diamond, flint and garnet grains, and any combination thereof. Examples of the filler can include powders, granules, spheres, fibers, pore formers, hollow particles, and a combination thereof. The filler can be selected from the group consisting of powders, granules, spheres, fibers, pore formers, polymer hollow particles, and a combination thereof.

In a further embodiment, the filler can include a material selected from the group consisting of sand, bubble alumina, chromites, magnetite, dolomites, bubble mullite, borides, titanium dioxide, carbon products, silicon carbide, wood flour, clay, talc, hexagonal boron nitride, molybdenum disulfide, feldspar, nepheline syenite, glass spheres, glass fibers, $CaF_2$, $KBF_4$, Cryolite ($Na_3AlF_6$), potassium Cryolite ($K_3AlF_6$), pyrite, ZnS, copper sulfide, mineral oil, fluorides, carbonates, calcium carbonate, saran, phenoxy resin, CaO, $K_2SO_4$, mineral wool, $MnCl_2$, KCl, and a combination thereof.

In accordance with another embodiment, the filler can include a material selected from the group consisting of an antistatic agent, a lubricant, a porosity inducer, coloring agent, and a combination thereof. The filler may include iron and sulfur having an average particle size of not greater than about 40 microns. In a particular embodiment, the filler can consist essentially of any one of the materials described herein. In another particular embodiment, the filler can consist essentially of two or more of the materials described in embodiments herein.

According to at least one embodiment, the bond material can include at least one organic material, such as natural organic materials or synthetic organic materials. According to another embodiment, the bond material can include a thermoset or a thermoplastic. In still another embodiment, the organic material can include a resin, such as phenolic resins, epoxy resins, polyester resins, polyurethanes, polyester, rubber, polyimide, polybenzimidazole, aromatic polyamide, modified phenolic resins (such as: epoxy modified and rubber modified resins, or phenolic resin blended with plasticizers, etc.), and so forth, as well as any combination thereof. Exemplary phenolic resins can include resole and novolac. According to a further embodiment, the bond material can include a material selected from the group consisting of a resin, a thermoset, a thermoplastic, a phenolic resin, and a combination thereof. For example, the bond material can include a material selected from the group consisting of phenolics, epoxies, polyesters, cyanate esters, shellacs, polyurethanes, rubber, and a combination thereof. In a particular embodiment, the bond material can consist essentially of any one of the organic materials described herein. In another embodiment, the bond material can consist essentially of two or more of the organic materials described herein.

In another embodiment, the bond material can include a curing agent or a cross-link agent. The curing or cross-link agent can include an amine. Exemplary amines can include ethylene diamine; ethylene triamine; methyl amines, or the like. In a particular embodiment, the curing or cross-linking agent can include hexamethylene tetramine. According to another embodiment, the bond material can include a phenolic resin modified with a curing or cross-linking agent, such as hexamethylene tetramine.

The organic material can be in a liquid form, and act as a precursor bond material, which may be formed into the finally-formed bond material by curing. In a particular embodiment, the bond material can include a phenolic resin having cross-linked domains having a sub-micron average size.

Curing can be performed at step 102, after forming the mixture at step 101. Curing can take place in the presence of heat. For example, the mixture can be held at a final cure temperature for a period of time, such as between 6 hours and 48 hours, between 10 and 36 hours, or until the mixture reaches the cross-linking temperature or desired density is obtained. Selection of the curing temperature depends, for instance, on factors such as the type of bonding material employed, strength, hardness, and grinding performance desired. According to certain embodiments, the curing temperature can be in the range including at least 150° C. to not greater than 250° C. In more specific embodiments employing organic bonds, the curing temperature can be in the range including at least 150° C. to not greater than 230° C. Polymerization of phenol based resins may occur at a temperature in the range of including at least 110° C. and not greater than 225° C. Resole resins can polymerize at a temperature in a range of including at least 140° C. and not greater than 225° C. Certain novolac resins suitable for the embodiments herein can polymerize at a temperature in a range including at least 110° C. and not greater than 195° C.

In accordance with at least one embodiment, the abrasive particles can include nanocrystalline alumina having particular average crystallite sizes. For example, the average crystallite size of the nanocrystalline alumina particles may be not greater than 0.15 microns, such as not greater than 0.14 microns, not greater than 0.13 microns, or not greater than 0.12 microns, or even not greater than 0.11 microns. In another embodiment, the average crystallite size can be at least 0.01 microns, such as at least 0.02 microns, at least 0.05 microns, at least 0.06 microns, at least 0.07 microns, at least 0.08 microns, or at least about 0.09 microns. It will be appreciated that the average crystallite size can be within a range including any of the minimum to maximum values noted above. For example, the average crystallite size can be within a range of 0.01 microns to 0.15 microns, 0.05 microns to 0.14 microns, or 0.07 microns to 0.14 microns. In a particular embodiment, the crystallite size can be within a range of 0.08 microns to 0.14 microns.

The average crystallite size can be measured based on the uncorrected intercept method using scanning electron microscope (SEM) photomicrographs. Samples of abrasive grains are prepared by making a bakelite mount in expoxy resin then polished with diamond polishing slurry using a Struers Tegramin 30 polishing unit. After polishing the epoxy is heated on a hot plate, the polished surface is then thermally etched for 5 minutes at 150° C. below sintering temperature. Individual grains (5-10 grits) are mounted on the SEM mount then gold coated for SEM preparation. SEM photomicrographs of three individual abrasive particles are taken at approximately 50,000× magnification, then the uncorrected crystallite size is calculated using the following steps: 1) draw diagonal lines from one corner to the opposite corner of the crystal structure view, excluding black data band at bottom of photo (see, for example, FIGS. 7A and 7B); 2) measure the length of the diagonal lines as L1 and L2 to the nearest 0.1 centimeters; 3) count the number of grain boundaries intersected by each of the diagonal lines, (i.e., grain boundary intersections I1 and I2) and record this number for each of the diagonal lines, 4) determine a calculated bar number by measuring the length (in centimeters) of the micron bar (i.e., "bar length") at the bottom of each photomicrograph or view screen, and divide the bar length (in microns) by the bar length (in centimeters); 5) add the total centimeters of the diagonal lines drawn on photomicrograph (L1+L2) to obtain a sum of the diagonal lengths; 6) add the numbers of grain boundary intersections for both diagonal lines (I1+I2) to obtain a sum of the grain boundary intersections; 7) divide the sum of the diagonal lengths (L1+L2) in centimeters by the sum of grain boundary intersections (I1+I2) and multiply this number by the calculated bar number. This process is completed at least three different times for three different, randomly selected samples to obtain an average crystallite size.

As an example of calculating the bar number, assume the bar length as provided in a photo is 0.4 microns. Using a ruler the measured bar length in centimeters is 2 cm. The bar length of 0.4 microns is divided by 2 cm and equals 0.2 um/cm as the calculated bar number. The average crystalline size is calculated by dividing the sum of the diagonal lengths (L1+L2) in centimeters by the sum of grain boundary intersections (I1+I2) and multiply this number by the calculated bar number.

According to an embodiment, the nanocrystalline alumina can include at least 51 wt % alumina relative the total weight of the abrasive particles. For instance, the content of alumina within the nanocrystalline alumina can be at least about 60 wt %, at least 70 wt %, at least 80 wt %, at least about 85 wt %, or even higher, such as at least 90 wt %, at least 92 wt %, at least 93 wt %, or at least 94 wt %. In one non-limiting embodiment, the content of alumina may be not greater than 99.9 wt %, such as not be greater than 99 wt %, not greater than 98.5 wt %, not greater than 98 wt %, not greater than 97.5 wt %, not greater than 97 wt %, not greater than 96.5 wt %, or not greater than 96 wt %. It will be appreciated that the content of alumina can be within a range including any of the minimum to maximum percentages noted above. For example, the content can be within a range of 60 wt % to 99.9 wt %, within a range of 70 wt % to 99 wt %, within a range of 85 wt % to 98 wt %, or within a range of 90 wt % to 96.5 wt %. In a particular embodiment, the monocrystalline alumina can consist essentially of alumina, such as alpha alumina.

As described herein, the nanocrystalline alumina can have many particular features. These features can be similarly applied to the abrasive particles. For example, the abrasive particles can include a weight percent of alumina for the total weight of the abrasive particles that is similar to the content of the alumina relative to the total weight of the nanocrystalline alumina. For instance, the content of the alumina in the abrasive particles for the total weight of the abrasive particles can be at least at least 60 wt %, such as at least 70 wt %, at least 80 wt %, at least 85 wt %, at least 90 wt %, at least 92 wt %, at least 93 wt %, or at least 94 wt %. For another instance, the content of alumina in the abrasive particles may not be greater than 99.9 wt %, such as not be greater than 99 wt %, not greater than 98.5 wt %, not greater than 98 wt %, not greater than 97.5 wt %, not greater than 97 wt %, not greater than 96.5 wt %, or not greater than 96 wt %. It will be appreciated that the abrasive particles can include the alumina in the content within a range of minimum and maximum percentages noted above. For example, the content can be within a range of 60 wt % to 99.9 wt %, within a range of 70 wt % to 99 wt %, within a range of 85 wt % to 98 wt %, or within a range of 90 wt % to 96.5 wt %. In a particular embodiment, the abrasive particles can consist essentially of alumina, such as alpha alumina.

In accordance with an embodiment, the nanocrystalline alumina can include at least one additive. The additive can include a transition metal element, a rare-earth element, an alkali metal element, an alkaline earth metal element, silicon, or a combination thereof. In a further embodiment, the additive can be selected from the group consisting of a transition metal element, a rare-earth element, an alkali metal element, an alkaline earth metal element, silicon, and a combination thereof. It will be appreciated that the additive described in embodiments associated with the nanocrystalline alumina can be applied to the abrasive particles. In an embodiment, the abrasive particles can include one or more of the additives described herein.

In another embodiment, the additive can include a material including for example, magnesium, zirconium, calcium, silicon, iron, yttrium, lanthanum, cerium, or a combination thereof. In a further embodiment, the additive can include at least two materials selected from the group consisting of magnesium, zirconium, calcium, silicon, iron, yttrium, lanthanum, and cerium. It will be appreciated that the nanocrystalline alumina may consist essentially of alumina and one or more additives noted above. It will also be appreciated that the abrasive particles can consist essentially of alumina and one or more additives noted above.

In accordance with an embodiment, the total content of additives relative to the total weight of the nanocrystalline alumina particles may be not greater than 12 wt %, such as not be greater than 11 wt %, not greater than 10 wt %, not greater than 9.5 wt %, not greater than 9 wt %, not greater than 8.5 wt %, not greater than 8 wt %, not greater than 7.5 wt %, not greater than 7 wt %, not greater than 6.5 wt %, not greater than 6 wt %, not greater than 5.8 wt %, not greater than 5.5 wt %, or greater than 5.3 wt %, or not greater than 5 wt %. In another embodiment, the total content of additives can be at least 0.1 wt %, such as at least 0.3 wt %, at least 0.5 wt %, at least 0.7 wt %, at least 1 wt %, at least 1.3 wt %, at least 1.5 wt %, or at least 1.7 wt %, at least 2 wt %, at least 2.3 wt %, at least 2.5 wt %, at least 2.7 wt %, or even at least 3 wt %. It will be appreciated that the total content of additives within the nanocrystalline alumina can be within a range including any of the minimum to maximum percentages noted above. For example, the total content can be within a range 0.1 wt % to 12 wt %, such as within a range of 0.7 wt % to 9.5 wt %, or within a range of 1.3 wt % to 5.3 wt %. It will also be appreciated that the total content of the additives for the total weight of the abrasive particles can include the similar percentages or within a similar range of the embodiments herein.

In an embodiment, the additive can include magnesium oxide (MgO) in a content that can facilitate improving forming and/or performance of the abrasive article. The content of magnesium oxide relative to the total weight of the nanocrystalline alumina can be for example, at least 0.1 wt %, such as at least 0.3 wt %, at least 0.5 wt %, at least 0.7 wt %, or at least 0.8 wt %. For another instance, the content of magnesium oxide may be not greater than 5 wt %, such as not greater than 4.5 wt %, not greater than 4 wt %, not greater than 3.5 wt %, not greater than 3 wt %, or not greater than 2.8 wt %. It will be appreciated that the content of magnesium oxide can be within a range including any of the minimum to maximum percentages noted above. For example, the content can be within a range 0.1 wt % to 5 wt %, within a range of 0.3 wt % to 4.5 wt %, or within a range of 0.7 wt % to 2.8 wt %. In a particular embodiment, the nanocrystalline alumina may consist essentially of alumina and magnesium oxide within a range between any of the minimum and maximum values disclosed herein. It will also be appreciated that the content of magnesium oxide for the total weight of the abrasive articles can include any of the percentages or within any of the ranges described herein. In another particular embodiment, the abrasive particles may consist essentially of the nanocrystalline alumina and magnesium oxide within a range between any of the minimum and maximum values disclosed herein.

For another example, the additive can include zirconium oxide (ZrO$_2$), which may facilitate improved forming and/or performance of the abrasive article. The content of zirconium oxide for a total weight of the nanocrystalline alumina can be for example, at least 0.1 wt %, such as at least 0.3 wt %, at least 0.5 wt %, at least 0.7 wt %, at least 0.8 wt %, at least 1 wt %, at least 1.3 wt %, at least 1.5 wt %, at least 1.7 wt %, or at least 2 wt %. In another example, the content of zirconium oxide may be not greater than 8 wt %, not greater than 7 wt %, not greater than 6 wt %, not greater than 5.8 wt %, not greater than 5.5 wt %, or not greater than 5.2 wt %. It will be appreciated that the content of zirconium oxide can be within a range including any of the minimum to maximum percentages noted above. For example, the content can be within a range 0.1 wt % to 8 wt %, within a range of 0.3 wt % to 7 wt %, or within a range of 0.5 wt % to 5.8 wt %. In a particular embodiment, the nanocrystalline alumina may consist essentially of alumina and zirconium oxide within the range of embodiments herein. It will be also appreciated that the content of zirconium oxide for the total weight of the abrasive particles can include any of the percentages or within any of the ranges noted herein. In another particular embodiment, the abrasive particles may consist essentially of nanocrystalline alumina and ZrO2 within a range between any of the minimum and maximum percentages noted above.

In accordance with an embodiment, the additive can include magnesium oxide (MgO) and zirconium oxide (ZrO$_2$) in a particular additive ratio that can facilitate improved forming and/or performance of the abrasive article. The additive can also have an additive ratio (MgO/ZrO$_2$), a weight percent ratio between magnesium oxide and zirconium oxide, wherein MgO is the weight percent of MgO in the nanocrystalline alumina and ZrO$_2$ is the weight percent of ZrO$_2$ in the nanocrystalline alumina. For example, the ratio can be not greater than 1.5, such as not greater than 1.4, not greater than 1.3, not greater than 1.2, not greater than 1.1, not greater than 1, not greater than 0.95, not greater than 0.9, not greater than 0.85, not greater than 0.8, not greater than 0.75, not greater than 0.7, not greater than 0.65, not greater than 0.6, or not greater than 0.55. In another instance, the additive ratio (MgO/ZrO$_2$) can be at least about 0.01, at least 0.05, at least 0.1, at least 0.2, at least 0.3, at least 0.4, or at least 0.5. It will be appreciated that the additive ratio (MgO/ZrO$_2$) can be within a range including any of the minimum to maximum ratios noted above. For example, the additive ratio (MgO/ZrO$_2$) can be within a range of 0.01 to 1.5, within a range of 0.1 to 1.1, or within a range of 0.3 to 0.95. In a particular embodiment, the nanocrystalline alumina can consist essentially of alumina, and magnesium oxide and zirconium oxide in the additive ratio within the range including any of the minimum to maximum ratios described herein. It will also be appreciated that the abrasive particles can include magnesium oxide (MgO) and zirconium oxide (ZrO$_2$) in the weight percent ratio disclosed herein. In a particular embodiment, the abrasive particles may consist essentially of nanocrystalline alumina, and magnesium oxide and zirconium oxide in the additive ratio within the range including any of the minimum to maximum ratios described herein.

According to one embodiment, the additive can include calcium oxide (CaO). The nanocrystalline alumina can include a certain content of calcium oxide relative to the total weight of the nanocrystalline alumina that can facilitate improved forming and/or performance of the abrasive article. For example, the content of calcium oxide can be at least 0.01 wt %, such as at least 0.05 wt %, at least about 0.07 wt %, at least 0.1 wt %, at least 0.15 wt %, at least 0.2 wt %, or at least 0.25 wt %. In another instance, the content may be not greater than 5 wt %, such as not greater than 4 wt %, not greater than 3 wt %, not greater than 2 wt %, not greater than 1 wt %, not greater than 0.7 wt %, or not greater than 0.5 wt %. It will be appreciated that the content of calcium oxide can be within a range including any of the minimum to maximum ratios noted above. For example, the content can be within a range 0.01 wt % to 5 wt %, within a range of 0.07 wt % to 3 wt %, or within a range of 0.15 wt % to 0.7 wt %. In a particular embodiment, the nanocrystalline alumina can consist essentially of alumina, and calcium oxide in the content within the range including any of the minimum to maximum percentages described herein. It will also be appreciated that the content of calcium oxide for the total weight of the abrasive particles can include any of the percentages or within any of the ranges noted herein. In another particular embodiment, the abrasive particles may consist essentially of nanocrystalline alumina and ZrO2 within a range between any of the minimum and maximum percentages noted above.

According to another embodiment, the additive can include magnesium oxide (MgO) and calcium oxide (CaO). The nanocrystalline alumina can have an additive ratio (CaO/MgO), wherein MgO is the weight percent of MgO in the nanocrystalline alumina and CaO is the weight percent of CaO in the nanocrystalline alumina. The additive ratio may facilitate improved forming and/or performance. For an instance, the additive ratio may be not greater than 1, such as not greater than 0.95, not greater than 0.9, not greater than 0.85, not greater than 0.8, not greater than 0.75, not greater than 0.7, not greater than 0.65, not greater than 0.6, not greater than 0.55, not greater than 0.5, not greater than 0.45, or not greater than 0.4. For another example, the ratio can be at least 0.01, such as at least 0.05, at least 0.1, at least 0.15, at least 0.2, or at least 0.25. It will be appreciated that the additive ratio (CaO/MgO) can be within a range including any of the minimum to maximum ratios noted above. For example, the additive ratio can be within a range 0.01 to 1, within a range 0.05 to 0.9, or within a range 0.1 to 0.75. In a particular embodiment, the nanocrystalline alumina can consist essentially of alumina, and magnesium oxide and calcium oxide in the additive ratio within the range including any of the minimum and maximum ratios described herein. It will also be appreciated that the additive ratio of calcium oxide to magnesium oxide can include any of the ratios or within any of the ranges described herein. In another particular embodiment, the abrasive particles may consist essentially of nanocrystalline alumina, and calcium oxide and magnesium oxide in the additive ratio within a range between any of the minimum and maximum ratios noted above.

According to one embodiment, the nanocrystalline alumina can include a rare earth oxide. The examples of rare earth oxide can yttrium oxide, cerium oxide, praseodymium oxide, samarium oxide, ytterbium oxide, neodymium oxide, lanthanum oxide, gadolinium oxide, dysprosium oxide, erbium oxide, precursors thereof, or the like. In a particular embodiment, the rare earth oxide can be selected from the group consisting of yttrium oxide, cerium oxide, praseodymium oxide, samarium oxide, ytterbium oxide, neodymium oxide, lanthanum oxide, gadolinium oxide, dysprosium oxide, erbium oxide, precursors thereof, and combinations thereof. In another embodiment, the nanocrystalline alumina can be essentially free of a rare earth oxide and iron. It will be appreciated that the abrasive particles can include any of the rare earth oxide noted above. In another embodiment, the abrasive particles can be essentially free of a rare earth oxide and iron. In a further embodiment the abrasives particles can include a phase containing a rare earth, a divalent cation and alumina which may be in the form of a magnetoplumbite structure. An example of a magnetoplumbite structure is $MgLaAl_{11}O_{19}$.

In accordance with an embodiment, the nanocrystalline alumina can include a rare earth alumina crystallite. In another embodiment, the nanocrystalline alumina can include a rare earth aluminate phase. Still, according to another embodiment, the nanocrystalline alumina can include a spinel material. It will be appreciated that the abrasive particles can include a rare earth alumina crystallite, a rare earth aluminate phase, or a spinel material.

According to one embodiment, the nanocrystalline alumina can include nanocrystalline particles (e.g., grains or domains), which may be suitable for improving the formation and/or performance of an abrasive article. In certain embodiments, each nanocrystalline particle can include at least 50 vol % crystalline material, such as single crystalline material or polycrystalline material, for the total volume of each nanocrystalline particle. For example, each particle can include at least 75 vol % crystalline material, at least 85 vol % crystalline material, at least 90 vol % crystalline material, or at least 95 vol % crystalline material. In a particular embodiment, the nanocrystalline particles can consist essentially of crystalline material. It will be appreciated that the above described features of the nanocrystalline alumina can be applied to the abrasive particles. For example, each abrasive particle can include at least 50 vol % of crystalline material, such as single crystalline material or polycrystalline material, for the total volume of each abrasive particle. Moreover, it will be appreciated that the abrasive particles may consist essentially of a crystalline material including alpha alumina and one or more additives as described in the embodiments herein. More particularly, in at least one embodiment, the abrasive particles may consist essentially of a crystalline material consisting of alpha alumina and one or more additives as described in the embodiments herein.

In an embodiment, the nanocrystalline alumina can have certain physical properties including Vickers hardness and density. For example, Vickers hardness of the nanocrystalline alumina can be at least 18 GPa, at least 18.5 GPa, at least 19 GPa, or even at least 19.5 GPa. In another instance, Vickers hardness of the nanocrystalline alumina may not be greater than 26.5 GPa, such as not greater than 26 GPa, not greater than 25.5 GPa, not greater than 25 GPa, or even not greater than 24.5 GPa. It will be appreciated that the nanocrystalline alumina can have Vickers hardness within a range including any of the minimum to maximum values noted above. For example, Vickers hardness can be within a range of 18 GPa to 24.5 or within a range of 19 GPa to 24 GPa. In another embodiment, the physical properties of the nanocrystalline alumina can be similarly applied to the abrasive particles. For example the abrasive particles can have Vickers hardness noted above.

It will be appreciated that Vickers hardness is measured based on a diamond indentation method (well known in the art) of a polished surface of the abrasive grain. Samples of abrasive grains are prepared by making a bakelite mount in epoxy resin then polished with diamond polishing slurry using a Struers Tegramin 30 polishing unit. Using an Instron-Tukon 2100 Microhardness tester with a 500 gm load and a 50× objective lens, measure 5 diamond indents on five different abrasive particles. Measurement is in Vickers units, converted to GPa by dividing Vickers units by 100. Average and range of hardness are reported for a suitable sample size to make a statistically relevant calculation.

In an embodiment, the nanocrystalline alumina can have relative friability, which is breakdown of the nanocrystalline alumina relative to breakdown of the microcrystalline alumina having the same grit size, both of which breakdown is measured in the same manner as disclosed in more details below. The relative friability of the nanocrystalline alumina can be expressed in form of percentage, and that of the corresponding microcrystalline alumina is regarded as standard and set to be 100%. In an embodiment, the relative friability of the nanocrystalline alumina can be greater than 100%. For instance, the relative friability of the nanocrystalline alumina can be at least 102%, such as at least 105%, at least 108%, at least 110%, at least 112%, at least 115%, at least 120%, at least 125%, or at least 130%. In another instance, the relative friability of the nanocrystalline alumina may be not greater than 160%.

The relative friability is generally measured by milling a sample of the particles using tungsten carbide balls having an average diameter of ¾ inches for a given period of time, sieving the material resulting from the ball milling, and measuring the percent breakdown of the sample against that of a standard sample, which in the present embodiments, was a microcrystalline alumina sample having the same grit size.

Prior to ball milling, approximately 300 grams to 350 grams grains of a standard sample (e.g., microcrystalline alumina available as Cerpass® HTB from Saint-Gobain Corporation) are sieved utilizing a set of screens placed on a Ro-Tap® sieve shaker (model RX-29) manufactured by WS Tyler Inc. The grit sizes of the screens are selected in accordance with ANSI Table 3, such that a determinate number and types of sieves are utilized above and below the target particle size. For example, for a target particle size of grit 80, the process utilizes the following US Standard Sieve sizes, 1) 60, 2) 70; 3) 80; 4) 100; and 5) 120. The screens are stacked so that the grit sizes of the screens increase from top to bottom, and a pan is placed beneath the bottom screen to collect the grains that fall through all of the screens. The Ro-Tap® sieve shaker is run for 10 minutes at a rate of 287±10 oscillations per minute with the number of taps count being 150±10, and only the particles on the screen having the target grit size (referred to as target screen hereinafter) are collected as the target particle size sample. The same process is repeated to collect target particle size samples for the other test samples of material.

After sieving, a portion of each of the target particle size samples is subject to milling.

An empty and clean mill container is placed on a roll mill. The speed of the roller is set to 305 rpms, and the speed of the mill container is set to 95 rpms. About 3500 grams of flattened spherical tungsten carbide balls having an average diameter of ¾ inches are placed in the container. 100 grams of the target particle size sample from the standard material sample are placed in the mill container with the balls. The container is closed and placed in the ball mill and run for a duration of 1 minute to 10 minutes. Ball milling is stopped, and the balls and the grains are sieved using the Ro-Tap® sieve shaker and the same screens as used in producing the target particle size sample. The rotary tapper is run for 5 minutes using the same conditions noted above to obtain the target particles size sample, and all the particles that fall through the target screen are collected and weighed. The percent breakdown of the standard sample is the mass of the grains that passed through the target screen divided by the original mass of the target particle size sample (i.e., 100 grams). If the percent breakdown is within the range of 48% to 52%, a second 100 grams of the target particle size sample is tested using exactly the same conditions as used for the first sample to determine the reproducibility. If the second sample provides a percent breakdown within 48%-52%, the values are recorded. If the second sample does not provide a percent breakdown within 48% to 52%, the time of milling is adjusted, or another sample is obtained and the time of milling is adjusted until the percent breakdown falls within the range of 48%-52%. The test is repeated until two consecutive samples provide a percent breakdown within the range of 48%-52%, and these results are recorded.

The percent breakdown of a representative sample material (e.g., nanocrystalline alumina particles) is measured in the same manner as measuring the standard sample having the breakdown of 48% to 52%. The relative friability of the nanocrystalline alumina sample is the breakdown of the nanocrystalline sample relative to that of the standard microcrystalline sample.

In another instance, the nanocrystalline alumina can have a density of at least 3.85 g/cc, such as at least 3.9 g/cc or at least 3.94 g/cc. In another embodiment, the density of the nanocrystalline alumina may not be greater than 4.12 g/cc, such as not greater than 4.08 g/cc, not greater than 4.02 g/cc, or even not greater than 4.01 g/cc. It will be appreciated that the nanocrystalline alumina can have a density within a range including any of the minimum to maximum values described herein. For example, the density can be within a range of 3.85 g/cc to 4.12 g/cc or 3.94 g/cc to 4.01 g/cc. It will also be appreciated that the density of the abrasive particles can include any of the values or within any of the ranges descried herein.

According to an embodiment, the abrasive particles can include at least one type of abrasive particle. For example, the abrasive particles can include a blend including a first type of abrasive particle and a second type of abrasive particle. The first type of abrasive particle can include an abrasive particle comprising nanocrystalline alumina according to any of the embodiments herein. The second type of abrasive particle can include at least one material selected from the group consisting of oxides, carbides, nitrides, borides, oxycarbides, oxynitrides, superabrasives, carbon-based materials, agglomerates, aggregates, shaped abrasive particles, diluent particles, and a combination thereof. In a particular embodiment, the abrasive particles can consist essentially of nanocrystalline alumina.

In an embodiment, the body of the abrasive article of embodiments herein can include a fixed abrasive article. In another embodiment, the body can include a bonded abrasive article. The bonded abrasive article can include abrasive grains contained in a three-dimensional matrix of the bond material. The bonded abrasive body may be formed into any suitable shape as known by those of skill in the art, including but not limited to, abrasive wheels, cones, hones, cups, flanged-wheels, tapered cups, segments, mounted-point tools, discs, thin wheels, large diameter cut-off wheels, and the like.

According to an embodiment, the body of the abrasive article can include a certain content of the abrasive particles, which may facilitate improved formation and/or performance of an abrasive article. For instance, the content of the abrasive particles can be at least 2 vol % for the total volume of the body, at least 4 vol %, at least 6 vol %, at least 8 vol %, at least 10 vol %, at least 12 vol %, at least 14 vol %, at least 16 vol %, at least 18 vol %, at least 20 vol %, at least 25 vol %, at least 30 vol %, or even at least 35 vol %. In another instance, the content of the abrasive particles within the bonded abrasive body may be not greater than 65 vol %, such as not greater than 64 vol %, not greater than 62 vol %, not greater than 60 vol %, not greater than 58 vol %, not greater than 56 vol %, not greater than about 54 vol %, not greater than 52 vol %, not greater than 50 vol %, not greater than 48 vol %, not greater than 46 vol %, not greater than 44 vol %, not greater than 42 vol %, not greater than 40 vol %, not greater than 38 vol %, not greater than 36 vol %, not greater than 34 vol %, not greater than 32 vol %, not greater than 30 vol %, or greater than 28 vol %, not greater than 26 vol %, not greater than 24 vol %, not greater than 22 vol %, or not greater than 20 vol %. It will be appreciated that the content of the abrasive particles can be within a range including any of the minimum and maximum percentages noted above. For example, the content of the abrasive particles in the body can be within a range of 2 vol % to 64 vol %, within a range of 12 vol % to 62 vol %, or within a range of 20 vol % to 58 vol %.

In an embodiment, the content of the nanocrystalline alumina for the total volume of the body may be controlled to facilitate improved formation and/or performance of an abrasive article. For example, the content of nanocrystalline alumina can be at least 1 vol %, such as at least 2 vol %, at least 4 vol %, at least 6 vol %, at least 8 vol %, at least 10 vol %, at least 12 vol %, at least 14 vol %, at least 16 vol %, at least 18 vol %, at least 20 vol %, at least 25 vol %, at least 30 vol %, or at least 35 vol %. In another embodiment, the content of nanocrystalline alumina may be not greater than 65 vol %, such as not greater than 64 vol %, not greater than 62 vol %, not greater than 60 vol %, not greater than 58 vol %, not greater than 56 vol %, not greater than about 54 vol %, not greater than 52 vol %, not greater than 50 vol %, not greater than 48 vol %, not greater than 46 vol %, not greater than 44 vol %, not greater than 42 vol %, not greater than 40 vol %, not greater than 38 vol %, not greater than 36 vol %, not greater than 34 vol %, not greater than 32 vol %, not greater than 30 vol %, or greater than 28 vol %, not greater than 26 vol %, not greater than 24 vol %, not greater than 22 vol %, or not greater than 20 vol %. It will be appreciated that the content of the abrasive particles can be within a range including any of the minimum to maximum percentages noted above. For example, the content of the nanocrystalline alumina in the body can be within a range of 2 vol % to 64 vol %, within a range of 12 vol % to 62 vol %, or within a range of 20 vol % to 58 vol %.

According to an embodiment, the body can include a certain content of the bond material in embodiments herein. For example, the content of the bond material for a total volume of the body can be at least 1 vol %, such as at least 2 vol %, at least 5 vol %, at least 10 vol %, at least 20 vol %, at least 30 vol %, at least 35 vol %, at least 40 vol %, or at least 45 vol %. For another instance, the content of the bond material may be not greater than 98 vol %, such as not greater than 95 vol %, not greater than 90 vol %, not greater than 85 vol %, not greater than 80 vol %, not greater than 75 vol %, not greater than 70 vol %, not greater than 65 vol %, or not greater than 60 vol %, not greater than 55 vol %, not greater than 50 vol %, or not greater than 45 vol %, not greater than 40 vol %, or not greater than 35 vol %, not greater than 30 vol %, or not greater than 25 vol %. It will be appreciated that the content of the bond material can be within a range including any of the minimum to maximum percentages noted above. For example, the content of the bond material in the body can be within a range of 1 vol % to 98 vol %, within a range of 5 vol % to 85 vol %, or within a range of 20 vol % to 70 vol %.

The body of the abrasive article can be formed to have certain porosity. In an embodiment, the porosity can be at least 1 vol % for a total volume of the body. For example, the porosity can be at least 2 vol %, at least 4 vol %, at least 6 vol %, at least 8 vol %, at least 10 vol %, at least 12 vol %, at least 14 vol %, at least 16 vol %, at least 18 vol %, at least 20 vol %, at least 25 vol %, at least 30 vol %, at least 40 vol %, at least 45 vol %, at least 50 vol %, or at least 55 vol %. In another embodiment, the porosity of the body may be not greater than 80 vol %. For instance, the porosity may be not greater than 75 vol %, not greater than 70 vol %, not greater than 60 vol %, not greater than 55 vol %, not greater than 50 vol %, not greater than 45 vol %, not greater than 40 vol %, not greater than 35 vol %, not greater than 30 vol %, not greater than 25 vol %, not greater than 20 vol %, not greater than 15 vol %, not greater than 10 vol %, not greater than 5 vol %, or not greater than 2 vol %. It will be appreciated that the porosity of the body can be within a range including any of the minimum to maximum percentages noted above. For example, the content of the bond material in the body can be within a range of 1 vol % to 80 vol %, within a range of 8 vol % to 55 vol %, or within a range of 14 vol % to 30 vol %.

The porosity of the body can be in various forms. For instance, the porosity can be closed, open, or include closed porosity and open porosity. In an embodiment, the porosity can include a type of porosity selected from the group consisting of closed porosity, open porosity, and a combination thereof. In another embodiment, the majority of the porosity can include open porosity. In a particular embodiment, all of the porosity can essentially be open porosity. Still, in another embodiment, the majority of the porosity can include closed porosity. For example, all of the porosity can be essentially closed porosity.

The body can include pores having certain average pore sizes. In an embodiment, the average pore size may be not greater than 500 microns, such as not greater than 450 microns, not greater than 400 microns, not greater than 350 microns, not greater than 300 microns, not greater than 250 microns, not greater than 200 microns, not greater than 150 microns, or not greater than 100 microns. In another embodiment, the average pore size can be at least 0.01 microns, at least 0.1 microns, or at least 1 micron. It will be appreciated that the body can have an average pore size within a range including any of the minimum to maximum values noted above. For example, the average pore size of the body can be within a range of 0.01 microns to 500 microns, within a range of 0.1 microns to 350 microns, or within a range of 1 micron to 250 microns.

According to an embodiment, the abrasive particles of embodiments herein can include non-agglomerated particles, for example, the abrasive particles including the nanocrystalline alumina can be non-agglomerated particles. According to another embodiment, the abrasive particles can include agglomerated particles, for instance, the abrasive particles including the nanocrystalline alumina can be agglomerated particles.

In an embodiment, the abrasive particles including nanocrystalline alumina are shaped abrasive particles. The particles can include a two dimensional shape, a three-dimensional shape, or a combination thereof. Exemplary two dimensional shapes include regular polygons, irregular polygons, irregular shapes, triangles, partially-concave triangles, quadrilaterals, rectangles, trapezoids, pentagons, hexagons, heptagons, octagons, ellipses, Greek alphabet characters, Latin alphabet characters, Russian alphabet characters, and a combination thereof. In accordance with an embodiment, the abrasive particles can consist of any of the above noted two dimensional shapes. Exemplary three-dimensional shapes can include a polyhedron, a pyramid, an ellipsoid, a sphere, a prism, a cylinder, a cone, a tetrahedron, a cube, a cuboid, a rhombohedrun, a truncated pyramid, a truncated ellipsoid, a truncated sphere, a truncated cone, a pentahedron, a hexahedron, a heptahedron, an octahedron, a nonahedron, a decahedron, a Greek alphabet letter, a Latin alphabet character, a Russian alphabet character, a Kanji character, complex polygonal shapes, irregular shaped contours, a volcano shape, a monostatic shape, and a combination thereof. A monostatic shape can be a shape with a single stable resting position. In accordance with another embodiment, the abrasive particles can consist of any of the above noted three dimensional shapes. In a particular embodiment, the shaped abrasive particles can include a triangular two-dimensional shape. In another particular embodiment, the shaped abrasive particles can include a partially-concave triangular two-dimensional shape. The shaped abrasive particles and methods of forming can be found in US2013/0236725 A1 by Doruk O. Yener, et al. and US 2012/0167481 by Doruk O. Yener, et al., both of which are incorporated herein by reference in their entireties.

Figure 2:
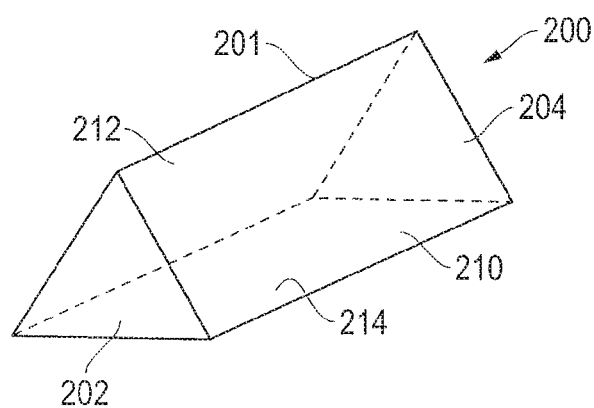
FIG. 2 includes perspective view of a shaped abrasive particle in accordance with an embodiment.

FIG. 2 includes a perspective view illustration of an exemplary shaped abrasive particle 200. The shaped abrasive particle can include a body 201 having a three-dimensional shape. The body 201 can be generally prismatic with a first end face 202 and a second end face 204. Further, the shaped abrasive particle 200 can include a first side face 210 extending between the first end face 202 and the second end face 204. A second side face 212 may extend between the first end face 202 and the second end face 204 adjacent to the first side face 210. As shown, the shaped abrasive particle 200 may also include a third side face 214 extending between the first end face 202 and the second end face 204 adjacent to the second side face 212 and the first side face 210. As shown, each end face 202, 204 of the shaped abrasive particle body 201 may be generally triangular in shape. Each side face 210, 212, 214 may be generally rectangular in shape. Further, the cross section of the shaped abrasive particle body 201 in a plane parallel to the end faces 202, 204 is generally triangular.

Figure 3:
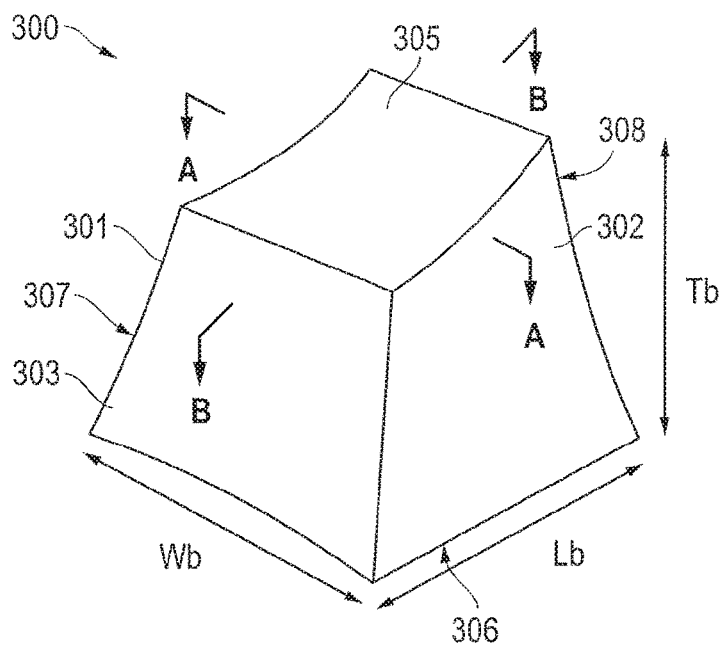
FIG. 3 includes a perspective view of a shaped abrasive particle in accordance with an embodiment.

FIG. 3 includes another perspective view illustration of an abrasive particle 300. As illustrated, the abrasive particle 300 can have a three-dimensional shape including a body 301 having an upper surface 305 and a bottom surface 306 opposite the upper surface 305. As further illustrated, the body 301 can be formed to have side surfaces 302, 303, 307, and 308 that extend between the upper surface 305 and the bottom surface 306.

As illustrated, the body 301 can have a body length (Lb), a body width (Wb), and a body thickness (Tb), and wherein Lb≥Wb, Lb≥Tb, and Wb≥Tb. In a further embodiment, the body can include a primary aspect ratio (Lb:Wb) of at least 1:1. For example, the aspect ratio (Lb:Wb) can be at least 2:1, at least 3:1, at least 5:1, or at least 10:1. In another instance, the aspect ratio (Lb:Wb) may be not greater than 1000:1 or not greater than 500:1. It will be appreciated that the aspect ratio (Lb:Wb) can be within a range including any of minimum to maximum values noted above, such as 1:1 to 1000:1. According to another embodiment, the body can have a secondary aspect ratio (Lb:Tb) of at least 1:1, at least 2:1, at least 3:1, at least 5:1, or at least 10:1. The secondary aspect ratio may be not greater than about 1000:1. It will be appreciated that the secondary aspect ratio (Lb:Tb) can be within a range including any of minimum to maximum values noted above, such as 1:1 to 1000:1. Still, according to another embodiment, the body can have a tertiary aspect ratio (Wb:Tb) of at least 1:1, at least 2:1, at least 3:1, at least 5:1, or at least 10:1. The tertiary aspect ratio may not be greater than about 1000:1. It will be appreciated that the tertiary aspect ratio (Wb:Tb) can be within a range including any of minimum to maximum values noted above, such as 1:1 to 1000:1.

In a further embodiment, at least one of the body length (Lb), the body width (Wb), and the body thickness (Tb) can have an average dimension of at least 0.1 microns. For example, the average dimension can be at least 1 micron, at least 10 microns, at least 50 microns, at least 100 microns, or at least 150 microns, at least 200 microns, at least 400 microns, at least 600 microns, at least 800 microns, or at least 1 mm. For another instance, the average dimension may not be greater than 20 mm, such as not greater than 18 mm, not greater than 16 mm, not greater than 14 mm, not greater than 12 mm, not greater than 10 mm, not greater than 8 mm, not greater than 6 mm, or not greater than 4 mm. It will be appreciated that the average dimension can be within a range including any of minimum to maximum values noted above, such as 1 micron to 20 mm, 10 microns to 18 mm, 50 microns to 14 mm, or 200 microns to 8 mm.

Figure 4:
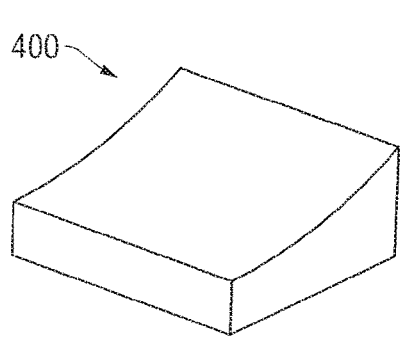
FIG. 4 includes a perspective view of a shaped abrasive particle in accordance with an embodiment.
Figure 5:
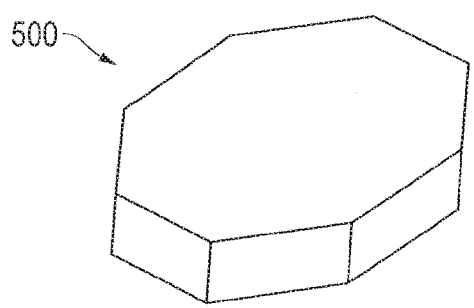
FIG. 5 includes a perspective view of a shaped abrasive particle in accordance with an embodiment.

In accordance with an embodiment, the body can include a cross-sectional shape in a plane defined by the body length and the body width. The cross-sectional shape can include triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof. In accordance with another embodiment, the body can include a cross-sectional shape in a plane defined by the body length and the body thickness. The cross-sectional shape can include triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof. The body can have a cross-sectional shape of any of the above noted shapes. For example, FIG. 4 includes a cross-sectional illustration of an abrasive particle 400 having a generally quadrilateral, and more particularly, a rectangular two-dimensional shape, as viewed in a plane defined by the width and the thickness. Alternatively, FIG. 5 includes a perspective view illustration of an abrasive particle 500 that can have a generally octagonal two-dimensional shape as viewed in a plane defined by the length and width.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

An abrasive article comprising:
a body including:
a bond material comprising an organic material; and
abrasive particles contained within the bond material, the abrasive particles comprising nanocrystalline alumina.

Embodiment 2

A method of forming an abrasive article comprising:
forming a mixture including:
a bond material comprising an organic material;
abrasive particles comprising nanocrystalline alumina; and
curing the mixture to form a fixed abrasive article.

Embodiment 3

The abrasive article or method of embodiment 1 or 2, wherein the bond material comprises a material selected from the group consisting of a resin, a thermoset, a thermoplastic, a phenolic resin, and a combination thereof.

Embodiment 4

The abrasive article or method of embodiment 1 or 2, wherein the bond material consists essentially of an organic material.

Embodiment 5

The abrasive article or method of embodiment 1 or 2, wherein the abrasive particles comprise nanocrystalline alumina having an average crystallite size of not greater than about 0.18 microns or not greater than about 0.17 microns or not greater than about 0.16 microns or not greater than about 0.15 microns or not greater than about 0.14 microns or not greater than about 0.13 microns.

Embodiment 6

The abrasive article or method of embodiment 1 or 2, wherein the abrasive particle comprise nanocrystalline alumina having an average crystallite size of at least about 0.01 microns or at least about 0.02 microns or at least about 0.05 microns or at least about 0.06 microns or at least about 0.07 microns or at least about 0.08 microns or at least about 0.09 microns.

Embodiment 7

The abrasive article or method of embodiment 1 or 2, wherein the nanocrystalline alumina comprises at least about 51 wt % alumina for the total weight of the particles or at least about 60 wt % or at least about 70 wt % or at least about 80 wt % or at least about 85 wt % or at least about 90 wt % or at least about 92 wt % or at least about 93 wt % or at least about 94 wt %.

Embodiment 8

The abrasive article or method of embodiment 1 or 2, wherein the nanocrystalline alumina comprises not greater than about 99.9 wt % alumina for the total weight of the particles or not greater than about 99 wt % or not greater than about 98.5 wt % or not greater than about 98 wt % or not greater than about 97.5 wt % or not greater than about 97 wt % or not greater than about 96.5 wt % or not greater than about 96 wt %.

Embodiment 9

The abrasive article or method of embodiment 1 or 2, wherein the nanocrystalline alumina comprises at least one additive selected from the group consisting of a transition metal element, a rare-earth element, an alkali metal element, an alkaline earth metal element, silicon, and a combination thereof.

Embodiment 10

The abrasive article or method of embodiment 9, wherein the additive comprises a material selected from the group consisting of magnesium, zirconium, calcium, silicon, iron, yttrium, lanthanum, cerium, and a combination thereof.

Embodiment 11

The abrasive article or method of embodiment 9, wherein the additive includes at least two materials selected from the group consisting of magnesium, zirconium, calcium, silicon, iron, yttrium, lanthanum, and cerium.

Embodiment 12

The abrasive article or method of embodiment 9, wherein the nanocrystalline alumina comprises a total content of additive of not greater than about 12 wt % for a total weight of the nanocrystalline alumina particles or not greater than about 11 wt % or not greater than about 10 wt % or not greater than about 9.5 wt % or not greater than about 9 wt % or not greater than about 8.5 wt % or not greater than about 8 wt % or not greater than about 7.5 wt % or not greater than about 7 wt % or not greater than about 6.5 wt % or not greater than about 6 wt % or not greater than about 5.8 wt % or not greater than about 5.5 wt % or not greater than about 5.3 wt % or not greater than about 5 wt %.

Embodiment 13

The abrasive article or method of embodiment 9, wherein the nanocrystalline alumina comprises a total content of additive of at least about 0.1 wt % for a total weight of the nanocrystalline alumina particles or at least about 0.3 wt % or at least about 0.5 wt % or at least about 0.7 wt % or at least about 1 wt % or at least about 1.3 wt % or at least about 1.5 wt % or at least about 1.7 wt % or at least about 2 wt % or at least about 2.3 wt % or at least about 2.5 wt % or at least about 2.7 wt % or at least about 3 wt %.

Embodiment 14

The abrasive article or method of embodiment 9, wherein the additive includes magnesium oxide (MgO).

Embodiment 15

The abrasive article or method of embodiment 14, wherein the nanocrystalline alumina comprises at least about 0.1 wt % MgO for a total weight of the nanocrystalline alumina or at least about 0.3 wt % or at least about 0.5 wt % or at least about 0.7 wt % or at least about 0.8 wt %.

Embodiment 16

The abrasive article or method of embodiment 14, wherein the nanocrystalline alumina comprises not greater than about 5 wt % MgO for a total weight of the nanocrystalline alumina or not greater than about 4.5 wt % or not greater than about 4 wt % or not greater than about 3.5 wt % or not greater than about 3 wt % or not greater than about 2.8 wt %.

Embodiment 17

The abrasive article or method of embodiment 9, wherein the additive includes zirconium oxide (ZrO2).

Embodiment 18

The abrasive article or method of embodiment 17, wherein the nanocrystalline alumina comprises at least about 0.1 wt % ZrO2 for a total weight of the nanocrystalline alumina or at least about 0.3 wt % or at least about 0.5 wt % or at least about 0.7 wt % or at least about 0.8 wt % or at least about 1 wt % or at least about 1.3 wt % or at least about 1.5 wt % or at least about 1.7 wt % or at least about 2 wt %.

Embodiment 19

The abrasive article or method of embodiment 17, wherein the nanocrystalline alumina comprises not greater than about 8 wt % ZrO2 for a total weight of the nanocrystalline alumina or not greater than about 7 wt % or not greater than about 6 wt % or not greater than about 5.8 wt % or not greater than about 5.5 wt % or not greater than about 5.2 wt %.

Embodiment 20

The abrasive article or method of embodiment 9, wherein the additive includes magnesium oxide (MgO) and zirconium oxide (ZrO2).

Embodiment 21

The abrasive article or method of embodiment 20, wherein the nanocrystalline alumina comprises an additive ratio (MgO/ZrO$_2$) of not greater than 1.5, wherein MgO is the weight percent of MgO in the nanocrystalline alumina and ZrO2 is the weight percent of ZrO2 in the nanocrystalline alumina, wherein the additive ratio is (MgO/ZrO2) is not greater than about 1.4 or not greater than about 1.3 or not greater than about 1.2 or not greater than about 1.1 or not greater than about 1 or not greater than about 0.95 or not greater than about 0.9 or not greater than about 0.85 or not greater than about 0.8 or not greater than about 0.75 or not greater than about 0.7 or not greater than about 0.65 not greater than about 0.6 or not greater than about 0.55.

Embodiment 22

The abrasive article or method of embodiment 20, wherein the nanocrystalline alumina comprises an additive ratio (MgO/ZrO2) of at least about 0.01, wherein MgO is the weight percent of MgO in the nanocrystalline alumina and ZrO2 is the weight percent of ZrO2 in the nanocrystalline alumina, wherein the additive ratio is (MgO/ZrO2) is at least about 0.05 or at least about 0.1 or least about 0.2 or at least about 0.3 or at least about 0.4 or at least about 0.5.

Embodiment 23

The abrasive article or method of embodiment 9, wherein the additive includes calcium oxide (CaO).

Embodiment 24

The abrasive article or method of embodiment 23, wherein the nanocrystalline alumina comprises at least about 0.01 wt % CaO for a total weight of the nanocrystalline alumina or at least about 0.05 wt % or at least about 0.07 wt % or at least about 0.1 wt % or at least about 0.15 wt % or at least about 0.2 wt % or at least about 0.25 wt %.

Embodiment 25

The abrasive article or method of embodiment 23, wherein the nanocrystalline alumina comprises not greater than about 5 wt % CaO for a total weight of the nanocrystalline alumina or not greater than about 4 wt % or not greater than about 3 wt % or not greater than about 2 wt % or not greater than about 1 wt % or not greater than about 0.7 wt % or not greater than about 0.5 wt %.

Embodiment 26

The abrasive article or method of embodiment 9, wherein the additive includes magnesium oxide (MgO) and calcium oxide (CaO).

Embodiment 27

The abrasive article or method of embodiment 26, wherein the nanocrystalline alumina comprises an additive ratio (CaO/MgO) of not greater than 1, wherein MgO is the weight percent of MgO in the nanocrystalline alumina and CaO is the weight percent of CaO in the nanocrystalline alumina, wherein the additive ratio is (CaO/MgO) is not greater than about 0.95 or not greater than about 0.9 or not greater than about 0.85 or not greater than about 0.8 or not greater than about 0.75 or not greater than about 0.7 or not greater than about 0.65 not greater than about 0.6 or not greater than about 0.55 or not greater than about 0.5 or not greater than about 0.45 not greater than about 0.4.

Embodiment 28

The abrasive article or method of embodiment 26, wherein the nanocrystalline alumina comprises an additive ratio (CaO/MgO) of at least about 0.01, wherein MgO is the weight percent of MgO in the nanocrystalline alumina and CaO is the weight percent of CaO in the nanocrystalline alumina, wherein the additive ratio is (CaO/MgO) is at least about 0.05 or at least about 0.1 or at least about 0.15 or at least about 0.2 or at least about 0.25.

Embodiment 29

The abrasive article or method of embodiment 1 or 2, wherein the nanocrystalline alumina comprises a rare earth oxide selected from the group consisting of yttrium oxide, cerium oxide, praseodymium oxide, samarium oxide, ytterbium oxide, neodymium oxide, lanthanum oxide, gadolinium oxide, dysprosium oxide, erbium oxide, precursors thereof, and combinations thereof.

Embodiment 30

The abrasive article or method of embodiment 1 or 2, wherein the nanocrystalline alumina comprises a rare earth alumina crystallite.

Embodiment 31

The abrasive article or method of embodiment 1 or 2, wherein the nanocrystalline alumina comprises a spinel material.

Embodiment 32

The abrasive article or method of embodiment 1 or 2, wherein the nanocrystalline material comprises nanocrystalline particles and each particle includes at least about 50 vol % crystalline or polycrystalline material for the total volume of each particle or at least about 75 vol % crystalline or polycrystalline material or at least about 85 vol % crystalline or polycrystalline material or at least about 90 vol % crystalline or polycrystalline material or at least about 95 vol % crystalline or polycrystalline material or wherein each particle consists essentially of crystalline or polycrystalline material.

Embodiment 33

The abrasive article or method of embodiment 1 or 2, wherein the nanocrystalline alumina is essentially free of a rare earth oxide and iron.

Embodiment 34

The abrasive article or method of embodiment 1 or 2, wherein the nanocrystalline alumina comprises a rare earth aluminate phase.

Embodiment 35

The abrasive article or method of embodiment 1 or 2, wherein the nanocrystalline alumina comprises a Vickers hardness of at least about 18 GPa or at least about 18.5 GPa or at least 19 GPa or at least about 19.5 GPa.

Embodiment 36

The abrasive article or method of embodiment 1 or 2, wherein the nanocrystalline alumina comprises a density of at least about 3.85 g/cc or at least about 3.9 g/cc or at least about 3.94 g/cc.

Embodiment 37

The abrasive article or method of embodiment 1 or 2, wherein the body comprises a fixed abrasive article.

Embodiment 38

The abrasive article or method of embodiment 1 or 2, wherein the body comprises a bonded abrasive article including the abrasive grains contained in a three-dimensional matrix of the bond material.

Embodiment 39

The abrasive article or method of embodiment 1 or 2, wherein the body comprises at least about 1 vol % abrasive particles for a total volume of the body or at least about 2 vol % or at least about 4 vol % or at least about 6 vol % or at least about 8 vol % or at least about 10 vol % or at least about 12 vol % or at least about 14 vol % or at least about 16 vol % or at least about 18 vol % or at least about 20 vol % or at least about 25 vol % or at least about 30 vol % or at least about 35 vol %.

Embodiment 40

The abrasive article or method of embodiment 1 or 2, wherein the body comprises not greater than about 65 vol % abrasive particles for a total volume of the body or not greater than about 64 vol % or not greater than about 62 vol % or not greater than about 60 vol % or not greater than about 58 vol % or not greater than about 56 vol % or not greater than about 54 vol % or not greater than about 52 vol % or not greater than about 50 vol % or not greater than about 48 vol % or not greater than about 46 vol % or not greater than about 44 vol % or not greater than about 42 vol % or not greater than about 40 vol % or not greater than about 38 vol % or not greater than about 36 vol % or not greater than about 34 vol % or not greater than about 32 vol % or not greater than about 30 vol % or not greater than about 28 vol % or not greater than about 26 vol % or not greater than about 24 vol % or not greater than about 22 vol % or not greater than about 20 vol %.

Embodiment 41

The abrasive article or method of embodiment 1 or 2, wherein the body comprises at least about 1 vol % nanocrystalline alumina for a total volume of the body or at least about 2 vol % or at least about 4 vol % or at least about 6 vol % or at least about 8 vol % or at least about 10 vol % or at least about 12 vol % or at least about 14 vol % or at least about 16 vol % or at least about 18 vol % or at least about 20 vol % or at least about 25 vol % or at least about 30 vol % or at least about 35 vol %.

Embodiment 42

The abrasive article or method of embodiment 1 or 2, wherein the body comprises not greater than about 65 vol % nanocrystalline alumina for a total volume of the body or not greater than about 64 vol % or not greater than about 62 vol % or not greater than about 60 vol % or not greater than about 58 vol % or not greater than about 56 vol % or not greater than about 54 vol % or not greater than about 52 vol % or not greater than about 50 vol % or not greater than about 48 vol % or not greater than about 46 vol % or not greater than about 44 vol % or not greater than about 42 vol % or not greater than about 40 vol % or not greater than about 38 vol % or not greater than about 36 vol % or not greater than about 34 vol % or not greater than about 32 vol % or not greater than about 30 vol % or not greater than about 28 vol % or not greater than about 26 vol % or not greater than about 24 vol % or not greater than about 22 vol % or not greater than about 20 vol %.

Embodiment 43

The abrasive article or method of embodiment 1 or 2, wherein the abrasive particles include a blend including a first type of abrasive particle including the nanocrystalline alumina and a second type of abrasive particle selected from the group consisting of oxides, carbides, nitrides, borides, oxycarbides, oxynitrides, superabrasives, carbon-based materials, agglomerates, aggregates, shaped abrasive particles, and a combination thereof.

Embodiment 44

The abrasive article or method of embodiment 1 or 2, wherein the abrasive particles consist essentially of nanocrystalline alumina.

Embodiment 45

The abrasive article or method of embodiment 1 or 2, wherein the body comprises at least about 1 vol % bond material for a total volume of the body or at least about 2 vol % or at least about 5 vol % or at least about 10 vol % or at least about 20 vol % or at least about 30 vol % or at least about 35 vol % or at least about 40 vol % or at least about 45 vol %.

Embodiment 46

The abrasive article or method of embodiment 1 or 2, wherein the body comprises not greater than about 98 vol % bond material for a total volume of the body or not greater than about 95 vol % or not greater than about 90 vol % or not greater than about 85 vol % or not greater than about 80 vol % or not greater than about 75 vol % or not greater than about 70 vol % or not greater than about 65 vol % or not greater than about 60 vol % or not greater than about 55 vol % or not greater than about 50 vol % or not greater than about 45 vol % or not greater than about 40 vol % or not greater than about 35 vol % or not greater than about 30 vol % or not greater than about 25 vol %.

Embodiment 47

The abrasive article or method of embodiment 1 or 2, wherein the wherein the body comprises at least about 1 vol % porosity for a total volume of the body or at least about 2 vol % or at least about 4 vol % or at least about 6 vol % or at least about 8 vol % or at least about 10 vol % or at least about 12 vol % or at least about 14 vol % or at least about 16 vol % or at least about 18 vol % or at least about 20 vol % or at least about 25 vol % or at least about 30 vol % or at least about 40 vol % or at least about 45 vol % or at least about 50 vol % or at least about 55 vol %.

Embodiment 48

The abrasive article or method of embodiment 1 or 2, wherein the body comprises not greater than about 80 vol % porosity for a total volume of the body or not greater than about 75 vol % or not greater than about 70 vol % or not greater than about 65 vol % or not greater than about 60 vol % or not greater than about 55 vol % or not greater than about 50 vol % or not greater than about 45 vol % or not greater than about 40 vol % or not greater than about 35 vol % or not greater than about 30 vol % or not greater than about 25 vol % or not greater than about 20 vol % or not greater than about 15 vol % or not greater than about 10 vol % or not greater than about 5 vol % or not greater than about 2 vol %.

Embodiment 49

The abrasive article or method of embodiment 1 or 2, wherein the body comprises porosity comprises a type of porosity selected from the group consisting of closed porosity, open porosity, and a combination thereof.

Embodiment 50

The abrasive article or method of embodiment 1 or 2, wherein the body comprises porosity, and wherein a majority of the porosity is open porosity, wherein essentially all of the porosity is open porosity.

Embodiment 51

The abrasive article or method of embodiment 1 or 2, wherein the body comprises porosity and the majority of the porosity is closed porosity, wherein essentially all of the porosity is closed porosity.

Embodiment 52

The abrasive article or method of embodiment 1 or 2, wherein the body comprises porosity having an average pore size of at least about 0.01 microns or at least about 0.1 microns or at least about 1 micron.

Embodiment 53

The abrasive article or method of embodiment 1, wherein the abrasive particles comprising nanocrystalline alumina are non-agglomerated particles.

Embodiment 54

The abrasive article or method of embodiment 1 or 2, wherein the abrasive particles comprising nanocrystalline alumina are agglomerated particles.

Embodiment 55

The abrasive article or method of embodiment 1 or 2, wherein the abrasive particles comprising nanocrystalline alumina are shaped abrasive particles.

Embodiment 56

The abrasive article or method of embodiment 55, wherein the shaped abrasive particles comprise a two dimensional shape selected from the group consisting of regular polygons, irregular polygons, irregular shapes, triangles, partially-concave triangles, quadrilaterals, rectangles, trapezoids, pentagons, hexagons, heptagons, octagons, ellipses, Greek alphabet characters, Latin alphabet characters, Russian alphabet characters, and a combination thereof.

Embodiment 57

The abrasive article or method of embodiment 55, wherein the shaped abrasive particles comprise a three-dimensional shape selected from the group consisting of a polyhedron, a pyramid, an ellipsoid, a sphere, a prism, a cylinder, a cone, a tetrahedron, a cube, a cuboid, a rhombohedrun, a truncated pyramid, a truncated ellipsoid, a truncated sphere, a truncated cone, a pentahedron, a hexahedron, a heptahedron, an octahedron, a nonahedron, a decahedron, a Greek alphabet letter, a Latin alphabet character, a Russian alphabet character, a Kanji character, complex polygonal shapes, irregular shaped contours, a volcano shape, a monostatic shape, and a combination thereof, a monostatic shape is a shape with a single stable resting position.

Embodiment 58

The abrasive article or method of embodiment 55, wherein the shaped abrasive particle comprises a triangular two-dimensional shape.

Embodiment 59

The abrasive article or method of embodiment 55, wherein the shaped abrasive particle comprises a partially-concave triangular two-dimensional shape.

Embodiment 60

The abrasive article or method of embodiment 55, wherein the shaped abrasive particle includes body having a body length (Lb), a body width (Wb), and a body thickness (Tb), and wherein Lb>Wb, Lb>Tb, and Wb>Tb.

Embodiment 61

The abrasive article or method of embodiment 60, wherein the body comprises a primary aspect ratio (Lb:Wb) of at least about 1:1 or at least about 2:1 or at least about 3:1 or at least about 5:1 or at least about 10:1, and not greater than about 1000:1.

Embodiment 62

The abrasive article or method of embodiment 60, wherein the body comprises a secondary aspect ratio (Lb:Tb) of at least about 1:1 or at least about 2:1 or at least about 3:1 or at least about 5:1 or at least about 10:1, and not greater than about 1000:1.

Embodiment 63

The abrasive article or method of embodiment 60, wherein the body comprises a tertiary aspect ratio (Wb:Tb) of at least about 1:1 or at least about 2:1 or at least about 3:1 or at least about 5:1 or at least about 10:1, and not greater than about 1000:1.

Embodiment 64

The abrasive article or method of embodiment 60, wherein at least one of the body length (Lb), the body width (Wb), and the body thickness (Tb) has an average dimension of at least about 0.1 microns or at least about 1 micron or at least about 10 microns or at least about 50 microns or at least about 100 microns or at least about 150 microns or at least about 200 microns or at least about 400 microns or at least about 600 microns or at least about 800 microns or at least about 1 mm, and not greater than about 20 mm or not greater than about 18 mm or not greater than about 16 mm or not greater than about 14 mm or not greater than about 12 mm or not greater than about 10 mm or not greater than about 8 mm or not greater than about 6 mm or not greater than about 4 mm.

Embodiment 65

The abrasive article or method of embodiment 60, wherein the body comprises a cross-sectional shape in a plane defined by the body length and the body width selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Embodiment 66

The abrasive article or method of embodiment 60, wherein the body comprises a cross-sectional shape in a plane defined by the body length and the body thickness selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Embodiment 67

The abrasive article or method of embodiment 1 or 2, wherein the body comprises a filler selected from the group consisting of powders, granules, spheres, fibers, chopped strand fibers (CSF), hollow particles, polymer hollow spheres, and a combination thereof.

Embodiment 68

The abrasive article or method of embodiment 67, wherein the filler comprises a material selected from the group consisting of sand, bubble alumina, chromites, magnetite, dolomites, bubble mullite, borides, titanium dioxide, carbon products, silicon carbide, wood flour, clay, talc, hexagonal boron nitride, molybdenum disulfide, feldspar, nepheline syenite, glass spheres, glass fibers, CaF2, KBF4, Cryolite (Na3AlF6), potassium Cryolite (K3AlF6), pyrite, ZnS, copper sulfide, mineral oil, fluorides, carbonates, calcium carbonate, saran, phenoxy resin, CaO, K2SO4, mineral wool, MnCl2, KCl, and a combination thereof.

Embodiment 69

The abrasive article or method of embodiment 67, wherein the filler comprises a material selected from the group consisting of an antistatic agent, a lubricant, a porosity inducer, coloring agent, and a combination thereof. The filler may comprise iron and sulfur having an average particle size of not greater than about 40 microns.

Embodiment 70

The abrasive article or method of embodiment 1 or 2, wherein the bond material includes one or more natural organic materials, synthetic organic materials, and a combination thereof.

Embodiment 71

The abrasive article or method of embodiment 1 or 2, wherein the bond material comprises a material selected from the group consisting of phenolics, epoxies, polyesters, cyanate esters, shellacs, polyurethanes, rubber, and a combination thereof.

Embodiment 72

The abrasive article or method of embodiment 1 or 2, wherein the bond material comprises a phenolic resin modified with a curing or cross-linking agent including hexamethylene tetramine.

Embodiment 73

The abrasive article or method of embodiments 1 or 2, wherein the bond material comprises a phenolic resin having cross-linked domains having a sub-micron average size.

Embodiment 74

The abrasive article or method of embodiment 1 or 2, wherein the body has a shape selected from the group consisting of wheels, hones, cones, cups, flanged-wheels, tapered cups, discs, segments, mounted points, and a combination thereof.

Example 1

Figure 6A:
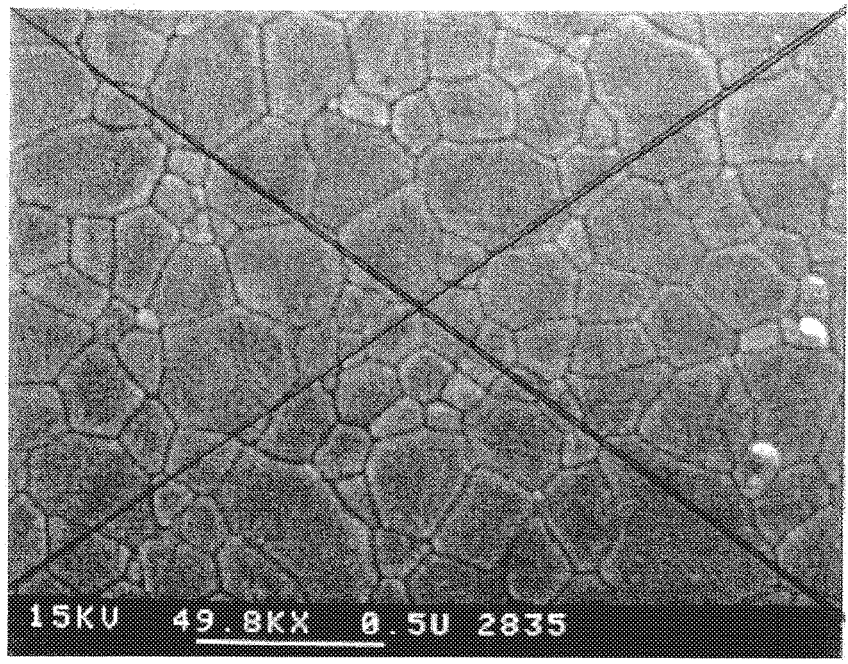
FIG. 6A includes a SEM image of conventional microcrystalline alumina grains.
Figure 6B:
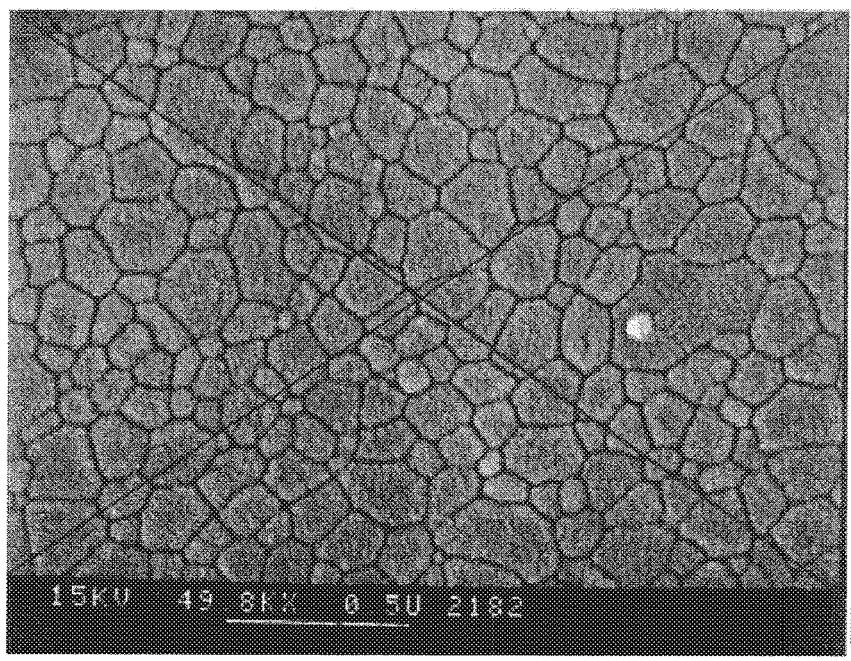
FIG. 6B includes a SEM image of nanocrystalline alumina grains in accordance with an embodiment.

FIGS. 6A and 6B include scanning electron microscopy (SEM) images of polished sections of the conventional microcrystalline alumina grains (FIG. 6A) and the nanocrystalline alumina grains (FIG. 6B) representative of embodiments herein. As illustrated, the average crystallite size for the microcrystalline alumina (MCA) is approximately 0.2 microns, while the average crystallite size of the nanocrystalline alumina (NCA) is approximately 0.1 microns.

Example 2

Vickers hardness of representative MCA grain samples and NCA grain samples was measured in accordance with embodiments disclosed herein. The MCA grains and the NCA grains were obtained from Saint-Gobain Corporation. The MCA grains are available as Cerpass® HTB. The crystallite sizes of the nanocrystalline alumina and the microcrystalline alumina are about 0.1 microns and 0.2 microns, respectively. The samples of MCA grains and NCA grains were prepared in the same manner. Vickers hardness of 5 samples of MCA grains and NCA grains were tested. The average Vickers hardness of the MCA grains and the NCA grains is disclosed in Table 1.

The relative friability of the NCA grains was measured in accordance with the procedures disclosed herein. The MCA and NCA samples had grit size 80, and the MCA grains were used as the standard sample. The ball milling time was 6 minutes. As disclosed in Table 1, the relative friability of the MCA grains is set as 100%, and the NCA grains demonstrated Vickers hardness very similar to that of MCA grains, but had relative friability of 123%.

TABLE 1

|  | MCA | NCA |
|---|---|---|
| Hardness (GPa) | 21.8 | 21.4 |
| Relative Friability | 100% | 123% |

Example 3

Two different types of samples were made from the MCA grains and NCA grains. Both of the MCA grains and the NCA grains were obtained from Saint-Gobain Corporation. The MCA grains are available as Cerpass® HTB. A first conventional grinding wheel sample (CS1) was made including 47 vol % abrasive grains, which included a mixture of approximately 25 vol % of microcrystalline alumina particles, 38 vol % fused alundum, 38 vol % SiC. Sample CS1 also included approximately 20 vol % of a resin bond and approximately 32 vol % porosity. A second, grinding wheel sample (S2) was made including approximately 47 vol % abrasive particles, which includes a mixture of approximately 25 vol % of the nanocrystalline alumina (NCA), 38 vol % fused alundum, and 38 vol % SiC. Sample S2 includes and having the same type and content of bond and porosity as sample CS1. Two version of each of the samples CS1 and S2 were made with 36 grit size abrasive particles and 54 grit size abrasive particles. The crystallite sizes of the NCA and MCA were about 0.1 microns and 0.2 microns, respectively.

The relative friability of the NCA and MCA grains used to make the wheel samples was measured in accordance with the procedures disclosed herein. The MCA grains were used as the standard sample. For the grains having grit size 36, the ball milling time was 3 minutes. For grit size 54, the ball milling time was 3 minutes and 15 seconds. The relative friability of the NCA grains is disclosed in Table 3. The relative friability of the MCA of CS1 and CS2 is set as 100%.

TABLE 3

| | Relative Friability |
|---|---|
| CS1-36 | 100% |
| S2-36 | 130% |
| CS1-54 | 100% |
| S2-54 | 116% |

Figure 7A:
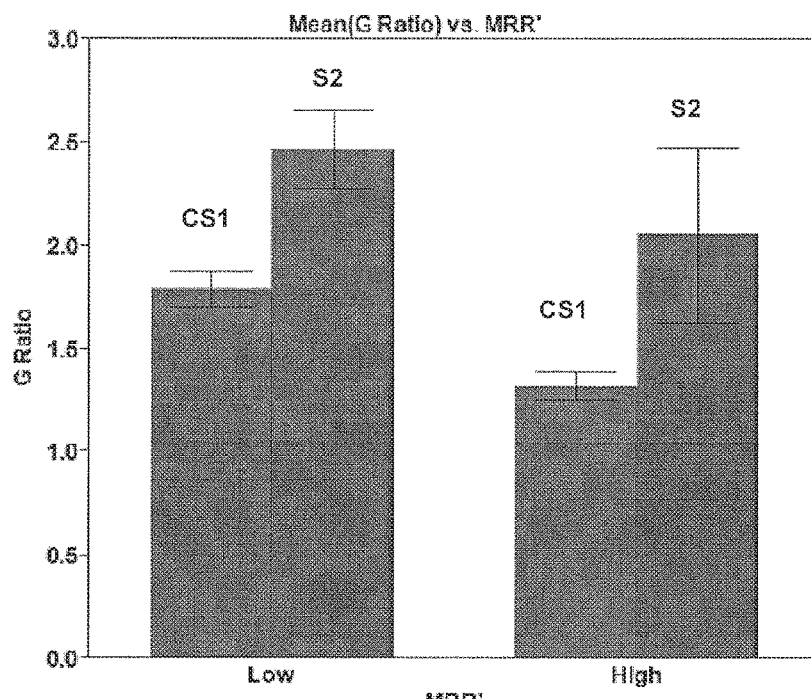
FIG. 7A includes a histogram of grinding ratio of abrasive samples.
Figure 7B:
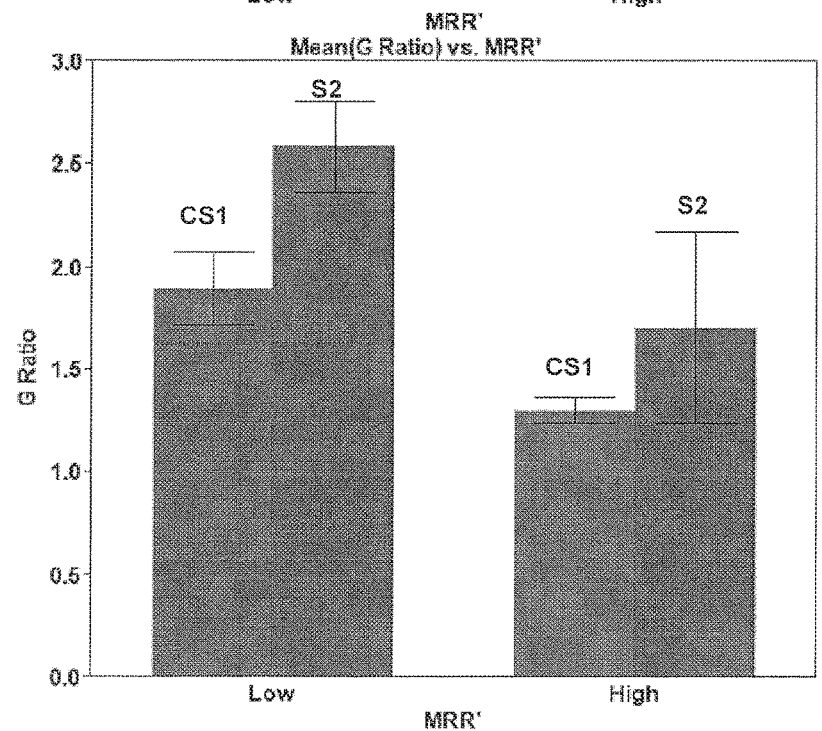
FIG. 7B includes a histogram of grinding ratio of abrasive samples.

The grinding ratios (G ratio) of the samples were tested using both a low material removal rate (MRR) operation and a high material removal rate operation to simulate various grinding conditions. As illustrated in FIG. 7A, for the 36 grit size versions of the samples, sample S2 demonstrated significantly higher G-ratio in both the low MRR and high MRR conditions as compared to sample CS1. As shown in FIG. 7B, for the 54 grit size versions of the samples, S2 had remarkably higher G ratio for the low MRR operations as compared to CS1. Moreover, for the high MRR conditions, S2 also demonstrated improvements over CS2.

The present embodiments represent a departure from the state of the art. While some patent publications have remarked that microcrystalline alumina can be made to have submicron average crystallite sizes, those of skill in the art recognize that commercially available forms of microcrystalline alumina have an average crystallite size of between approximately 0.18 to 0.25 microns. To the Applicants knowledge, alumina-based abrasives having finer average crystallite sizes have not been commercially available. Furthermore, the results of the abrasive articles including NCA demonstrated remarkable and unexpected results, particularly in view of the discovery that Vickers hardness of MCA and NCA grains had essentially no distinction, and one of ordinary skill in the art might not expect a significant difference in the performance of a bonded abrasive utilizing the NCA grains. However, surprisingly and remarkably, abrasive articles including the NCA grains had significantly improved G-ratio (a measure of the material removed from the sample compared to the material removed from the grinding wheel, and therefore, a measure of the efficiency of the abrasive article) for both high and low material removal rates, as compared to the abrasive articles including conventional MCA grains. Not wishing to be bound by any theory, the relative friability of the NCA grains as compared to the MCA grains (e.g., higher than 100%) may contribute to the improved G-ratio of the grinding wheels formed with the NCA grains.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
   a body including:
   a bond material in a content of 5 vol % to 55 vol % for a total volume of the body, wherein the bond material comprises an organic material;
   abrasive particles contained within the bond material, wherein the abrasive particles are in a content of 6 vol % to 65 vol % for the total volume of the body, wherein the abrasive particles comprises nanocrystalline alumina having an average crystallite size of at least 0.01 microns and not greater than 0.16 microns; and
   a porosity of 8 vol % to 70 vol % for the total volume of the body.

2. The abrasive article of claim 1, wherein the average crystallite size is in a range of at least 0.05 microns to not greater than about 0.14 microns.

3. The abrasive article of claim 1, wherein the abrasive particles comprise shaped abrasive particles, each shaped abrasive particle having a body including a two-dimensional shape selected from the group consisting of regular polygons, irregular polygons, irregular shapes, triangles, partially-concave triangles, quadrilaterals, rectangles, trapezoids, pentagons, hexagons, heptagons, octagons, ellipses, Greek alphabet characters, Latin alphabet characters, Russian alphabet characters, and a combination thereof.

4. The abrasive article of claim 1, wherein the abrasive particles comprising nanocrystalline alumina include an additive comprising a material selected from the group consisting of magnesium, zirconium, calcium, silicon, iron, yttrium, lanthanum, cerium, and a combination thereof.

5. The abrasive article of claim 4, wherein the abrasive particles comprising nanocrystalline alumina comprise a total content of the additive of at least about 0.1 wt % to not greater than about 12 wt % for a total weight of the nanocrystalline alumina.

6. The abrasive article of claim 4, wherein the additive includes magnesium oxide (MgO) and wherein the abrasive particles comprising nanocrystalline alumina comprise MgO in a content from at least about 0.1 wt % to not greater than about 5 wt % for a total weight of the nanocrystalline alumina.

7. The abrasive article of claim 4, wherein the additive includes zirconium oxide ($ZrO_2$), and wherein the abrasive particles comprising nanocrystalline alumina comprise $ZrO_2$ in a content from at least about 0.1 wt % to not greater than about 8 wt % for a total weight of the nanocrystalline alumina.

8. The abrasive article of claim 4, wherein the additive includes magnesium oxide (MgO) and zirconium oxide ($ZrO_2$), wherein the abrasive particles comprising nanocrystalline alumina comprise an additive ratio (MgO/$ZrO_2$) in a range from at least about 0.01 to not greater than 1.5.

9. The abrasive article of claim 4, wherein the additive includes calcium oxide (CaO), and wherein the abrasive particles comprising nanocrystalline alumina comprise a CaO in a content from at least about 0.01 wt % to not greater than about 5 wt % for a total weight of the nanocrystalline alumina.

10. The abrasive article of claim 4, wherein the additive includes magnesium oxide (MgO) and calcium oxide (CaO), and wherein the abrasive particles comprising nanocrystalline alumina comprise an additive ratio (CaO/MgO) of at least about 0.01 to not greater than 1.

11. The abrasive article of claim 1, wherein the body comprises for total volume of the body:
    45 vol % to 56 vol % of the abrasive particles;
    5 vol % to 40 vol % of the bond material; and
    16 vol % to 45 vol % of a porosity.

12. The abrasive article of claim 1, wherein the body comprises a content of the abrasive particles comprising nanocrystalline alumina, wherein the content is at least 4 vol % and not greater than 65 vol %.

13. The abrasive article of claim 1, wherein the abrasive particles comprises a first type of abrasive particles including nanocrystalline alumina and second type of abrasive particles including an oxide, a carbide, a nitride, a boride, an oxycarbide, an oxynitride, or a combination thereof.

14. The abrasive article of claim 1, wherein the abrasive particles further comprises abrasive particles including a fused alumina, abrasive particles including SiC, or a combination thereof.

15. The abrasive article of claim 14, wherein the body comprises for the total volume of the body:
    35 vol % to 50 vol % of the abrasive particles;
    10 vol % to 25 vol % of the bond material; and
    25 vol % to 35 vol % of a porosity.

16. A method of forming an abrasive article comprising:
    forming a mixture including:
        a bond material comprising an organic material;
        abrasive particles comprising nanocrystalline alumina having an average crystallite size of at least 0.01 microns and not greater than 0.16 microns; and
    curing the mixture to form a fixed abrasive article,
    wherein the fixed abrasive article comprises a body including for a total volume of the body:
        6 vol % to 65 vol % of the abrasive particles;
        5 vol % to 55 vol % of the bond material; and
        8 vol % to 70 vol % of a porosity.

17. The method of claim 16, wherein the average crystallite size is at least 0.07 microns and not greater than 0.13 microns.

18. The method of claim 16, wherein the abrasive particles comprising nanocrystalline alumina comprise at least about 51 wt % alumina for the total weight of the particles.

19. The method of claim 16, wherein the abrasive particles comprise at least one additive selected from the group consisting of a transition metal element, a rare-earth element, an alkali metal element, an alkaline earth metal element, silicon, and a combination thereof.

20. The method of claim 19, wherein the abrasive particles comprising nanocrystalline alumina comprise a total content of additive of not greater than about 12 wt % for a total weight of the nanocrystalline alumina.

* * * * *

(12) EX PARTE REEXAMINATION CERTIFICATE (12012th)
United States Patent
Zhong et al.

(10) Number: US 9,790,411 C1
(45) Certificate Issued: Mar. 14, 2022

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Yang Zhong, Hopkinton, MA (US); Nilanjan Sarangi, Shrewsbury, MA (US); Shu Yang, Worcester, MA (US); Ralph Bauer, Niagara Falls, CA (US); Stefan Vujcic, Buffalo, NY (US)

(73) Assignees: SAINT-GOBAIN ABRASIVES, INC, Worcester, MA (US); SAINT-GOBAIN ABRASIFS, Conflans-Sainte-Honorine (FR)

Reexamination Request:
No. 90/014,791, Jul. 12, 2021

Reexamination Certificate for:
Patent No.: 9,790,411
Issued: Oct. 17, 2017
Appl. No.: 14/984,274
Filed: Dec. 30, 2015

Related U.S. Application Data

(60) Provisional application No. 62/097,892, filed on Dec. 30, 2014.

(51) Int. Cl.
*B24D 3/20* (2006.01)
*B24D 3/28* (2006.01)
*C09K 3/14* (2006.01)
*B24D 3/34* (2006.01)

(52) U.S. Cl.
CPC .............. *C09K 3/1409* (2013.01); *B24D 3/28* (2013.01); *B24D 3/34* (2013.01); *C09K 3/1436* (2013.01)

(58) Field of Classification Search
None
See application file for complete search history.

(56) References Cited

To view the complete listing of prior art documents cited during the proceeding for Reexamination Control Number 90/014,791, please refer to the USPTO's public Patent Application Information Retrieval (PAIR) system under the Display References tab.

*Primary Examiner* — Ling X Xu

(57) ABSTRACT

An abrasive article can include a body including a bond material and abrasive particles contained within the bond material. The abrasive particles can include nanocrystalline alumina. The bond material can include an organic material. In an embodiment, the nanocrystalline alumina may have an average crystallite size of not greater than 1.5 microns. In another embodiment, the bond material and the abrasive particles may be mixed and the mixture may cure to form the abrasive article of embodiments herein.

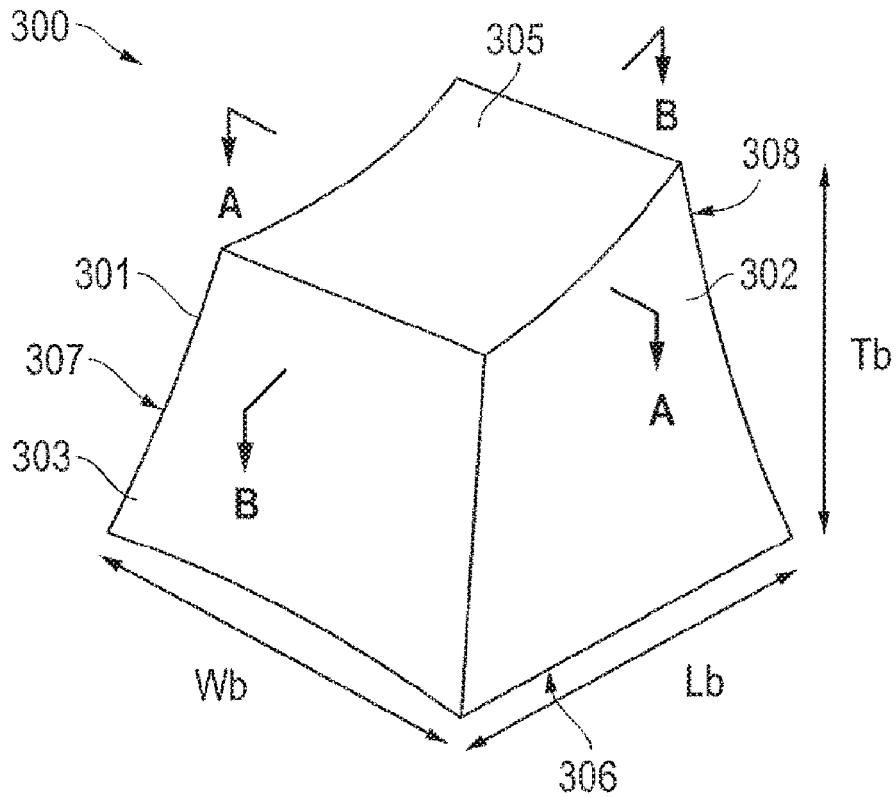

// US 9,790,411 C1

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-2, 4-10, 16, 17, 19 and 20 are determined to be patentable as amended.

Claims 3, 11-15 and 18, dependent on an amended claim, are determined to be patentable.

1. An abrasive article comprising:
    a body including:
        a bond material in a content of 5 vol % to 55 vol % for a total volume of the body, wherein the bond material comprises an organic material;
        abrasive particles contained within the bond material, wherein the abrasive particles are in a content of 6 vol % to 65 vol % for the total volume of the body, wherein the abrasive particles comprises nanocrystalline alumina having an average crystallite size of at least 0.01 microns and not greater than 0.16 microns, *wherein the abrasive particles comprising nanocrystalline alumina include an additive comprising a material selected from the group consisting of magnesium, zirconium, calcium, silicon, iron, yttrium, lanthanum, cerium, and a combination thereof, wherein the additive includes magnesium oxide (MgO) and zirconium oxide ($ZrO_2$), wherein the abrasive particles comprising nanocrystalline alumina comprise an additive ratio (MgO/$ZrO_2$) in a range from at least about 0.01 to not greater than 1.5*; and
        a porosity of 8 vol % to 70 vol % for the total volume of the body.

2. The abrasive article of claim 1, wherein the average crystallite size is in a range of at least [0.05] *0.08* microns to not greater than about [0.14] *0.13* microns.

4. The abrasive article of claim 1, [wherein the abrasive particles comprising nanocrystalline alumina include an additive comprising a material selected from the group consisting of magnesium, zirconium, calcium, silicon, iron, yttrium, lanthanum, cerium, and a combination thereof,] *wherein the nanocrystalline alumina has a density of at least 3.94 g/cc and at most 4.12 g/cc*.

5. The abrasive article of claim [4] *1*, wherein the abrasive particles comprising nanocrystalline alumina comprise a total content of the additive of at least about 0.1 wt % to not greater than about 12 wt % for [a] *the* total weight of the nanocrystalline alumina.

6. The abrasive article of claim [4] *1*, [wherein the additive includes magnesium oxide (MgO) and] wherein the abrasive particles comprising nanocrystalline alumina comprise MgO in a content from at least about 0.1 wt % to not greater than about 5 wt % for a total weight of the nanocrystalline alumina.

7. The abrasive article of claim [4] *1*, [wherein the additive includes zirconium oxide ($ZrO_2$), and] wherein the abrasive particles comprising nanocrystalline alumina comprise $ZrO_2$ in a content from at least about 0.1 wt % to not greater than about 8 wt % for a total weight of the nanocrystalline alumina.

8. The abrasive article of claim [4] *1*, [wherein the additive includes magnesium oxide (MgO) and zirconium oxide ($ZrO_2$),] wherein the abrasive particles comprising nanocrystalline alumina comprise an additive ratio (MgO/$ZrO_2$) in a range from at least about [0.01] *0.1* to not greater than [1.5] *0.95*.

9. The abrasive article of claim [4] *1*, wherein the additive includes calcium oxide (CaO), and wherein the abrasive particles comprising nanocrystalline alumina comprise CaO in a content from at least about 0.01 wt % to not greater than about 5 wt % for a total weight of the nanocrystalline alumina.

10. The abrasive article of claim [4] *1*, wherein the additive includes [magnesium oxide (MgO) and] calcium oxide (CaO), and wherein the abrasive particles comprising nanocrystalline alumina comprise an additive ratio (CaO/MgO) of at least about 0.01 to not greater than 1.

16. A method of forming an abrasive article comprising:
    forming a mixture including:
        a bond material comprising an organic material;
        abrasive particles comprising nanocrystalline alumina having an average crystallite size of at least 0.01 microns and not greater than 0.16 microns, *wherein the abrasive particles comprise at least one additive selected from the group consisting of a transition metal element, a rare-earth element, an alkali metal element, an alkaline earth metal element, silicon, and a combination thereof, wherein the additive includes magnesium oxide (MgO) and zirconium oxide ($ZrO_2$), wherein the abrasive particles comprising nanocrystalline alumina comprise an additive ratio (MgO/$ZrO_2$) in a range from at least about 0.01 to not greater than 1.5*; and
    curing the mixture to form a fixed abrasive article,
    wherein the fixed abrasive article comprises a body including for a total volume of the body:
        6 vol % to 65 vol % of the abrasive particles;
        5 vol % to 55 vol % of the bond material; and
        8 vol % to 70 vol % of a porosity.

17. The method of claim 16, wherein the average crystallite size is at least [0.07] *0.08* microns and not greater than 0.13 microns.

19. The method of claim 16, wherein the [abrasive particles comprise at least one additive selected from the group consisting of a transition metal element, a rare-earth element, an alkali metal element, an alkaline earth metal element, silicon, and a combination thereof] *additive ratio (MgO/$ZrO_2$) is at least 0.1 and not greater than 0.95*.

20. The method of claim [19] *16*, wherein the abrasive particles comprising nanocrystalline alumina comprise a total content of additive of not greater than about 12 wt % for [a] *the* total weight of the nanocrystalline alumina.

\* \* \* \* \*